(12) United States Patent
Leist et al.

(10) Patent No.: US 8,833,280 B2
(45) Date of Patent: Sep. 16, 2014

(54) METHOD FOR INTERPLANTING ENERGY CROPS

(75) Inventors: James R. Leist, Columbus, MS (US); Howard Duzan, Columbus, MS (US)

(73) Assignee: Weyerhaeuser NR Company, Federal Way, WA (US)

(*) Notice: Subject to any disclaimer, the term of this patent is extended or adjusted under 35 U.S.C. 154(b) by 390 days.

(21) Appl. No.: 13/309,180

(22) Filed: Dec. 1, 2011

(65) Prior Publication Data

US 2012/0145056 A1  Jun. 14, 2012

Related U.S. Application Data

(60) Provisional application No. 61/421,129, filed on Dec. 8, 2010.

(51) Int. Cl.
*A01G 23/02* (2006.01)
*A01C 21/00* (2006.01)

(52) U.S. Cl.
CPC ............. *A01C 21/00* (2013.01); *Y10S 111/923* (2013.01); *Y10S 111/90* (2013.01)
USPC ............................ 111/100; 111/923; 111/900

(58) Field of Classification Search
USPC ......... 111/923, 900, 200, 919, 100–104, 111, 111/901, 902, 906
See application file for complete search history.

(56) References Cited

U.S. PATENT DOCUMENTS

| | | |
|---|---|---|
| 1,522,331 A | 1/1925 | Schaeffer |
| 2,747,354 A | 5/1956 | Bloser |
| 2,994,142 A | 8/1961 | Newll et al. |
| 3,415,296 A | 12/1968 | Frankenberg et al. |
| 3,880,216 A | 4/1975 | Anderson et al. |
| 3,915,239 A | 10/1975 | Hendrichon |
| 4,058,913 A | 11/1977 | Esquilat |
| 4,062,305 A * | 12/1977 | Stoker .......................... 111/149 |
| 4,084,522 A * | 4/1978 | Younger ......................... 111/14 |
| 4,274,457 A | 6/1981 | Nilsen |
| 4,353,421 A | 10/1982 | Lahti |
| 4,781,129 A | 11/1988 | Swanson et al. |
| 4,836,295 A | 6/1989 | Estes |
| 4,967,545 A | 11/1990 | Fischer et al. |
| 5,680,715 A | 10/1997 | Thiboitot et al. |
| 6,119,792 A | 9/2000 | Almer |
| 6,454,018 B2 | 9/2002 | Tozer |
| 6,463,722 B1 | 10/2002 | De Groot |
| 6,904,979 B1 | 6/2005 | Confoey |

(Continued)

*Primary Examiner* — Alicia Torres
(74) *Attorney, Agent, or Firm* — Christensen O'Connor Johnson Kindness PLLC

(57) ABSTRACT

In methods according to some embodiments of the present disclosure for interplanting a primary crop and an energy crop, the present disclosure includes methods for preparing a plantation site for planting the energy crop. Plantation sites according to the disclosure may include a primary crop planted in a first row and in a second row, the first row being separated by an intermediate row. The intermediate row is divided into a center portion and two side portions (a first side portion and a second side portion). Methods according to embodiments of the disclosure include the steps of lifting a soil and plantation debris mixture from the intermediate area, redepositing a soil component of the soil and plantation debris mixture primarily into the center portion, and redepositing a plantation debris component of the soil and plantation debris mixture primarily into at least one of the two side portions.

19 Claims, 6 Drawing Sheets

(56) References Cited

U.S. PATENT DOCUMENTS

| | | |
|---|---|---|
| 7,412,932 B1 | 8/2008 | Bigelow et al. |
| 7,600,576 B2 | 10/2009 | Gayer |
| 7,634,869 B1 | 12/2009 | Williams, Jr. |
| 7,726,250 B2 | 6/2010 | Duzan et al. |
| 2003/0075087 A1* | 4/2003 | Gould et al. .................. 111/100 |
| 2006/0242898 A1 | 11/2006 | Peiffer |
| 2008/0172265 A1 | 7/2008 | Crane et al. |
| 2008/0236463 A1 | 10/2008 | Bigelow et al. |

* cited by examiner

METHOD FOR INTERPLANTING ENERGY CROPS

CROSS-REFERENCE TO RELATED APPLICATIONS

This application is entitled to and claims the benefit of priority under 35 U.S.C. §119 from U.S. Provisional Patent Application Ser. No. 61/421,129 filed Dec. 8, 2010, and titled "Method for Interplanting Energy Crops," the contents of which are incorporated herein by reference.

This application relates to U.S. patent application Ser. No. 13/309,214, filed on the same day as the present patent application, and titled "Soil Treating system and Shearing Assembly," the contents of which are incorporated herein by reference.

TECHNICAL FIELD

The present disclosure is directed generally to methods for interplanting energy crops with a primary crop on a plantation site.

BACKGROUND

Due to diminishing quantities of coal, petroleum, and natural gas products, attention is being directed to other energy sources, including oil shale, solar energy, and nuclear energy. One source receiving considerable attention is forest biomass materials such as wood, plants grown in conjunction with trees, and wood byproducts. Forest biomass may include any type of biomass produced by forest growth such as dead trees, non-merchantable trees, branches, understory, tree stumps, interplanted crops, other plants grown with trees, clippings, logging residue, stems, wood chips, or other similar material. Forest biomass has the potential for use in countless different applications including but not limited to generating heat, production of liquid fuel, production of biogas, generating bioelectricity, and production of feedstock for chemicals and other materials.

Some forestry companies have experimented with interplanting regenerating lignocellulosic energy crops with various types of trees crops for producing forest biomass. See, for example, U.S. Pat. No. 7,412,932, the contents of which is hereby incorporated by reference. As the demand for alternative energy sources continues to increase, there is also an increasing demand for new and innovative methods and equipment for producing forest biomass in conjunction with timberlands. Conventional agriculture equipment and methods are often not appropriate for the rough terrain (e.g., humps and swales), stumps, sticks, and other debris encountered in forestry operations. At the same time, the demands of modern forestry require that timberlands be managed at intense levels so as to produce maximum growth in the shortest period of time. Many of these intense practices can have a negative impact on soil, water quality, and greenhouse gas emissions. Accordingly, there is a need to develop new silviculture practices to enable growth of energy crops in conjunction with other crops whilst minimizing negative impacts on the environment.

SUMMARY

The following summary is provided for the benefit of the reader only and is not intended to limit in any way the invention as set forth by the claims. The present disclosure is directed generally towards methods for interplanting energy crops with a primary crop on a plantation site.

In some embodiments, the present disclosure includes methods for preparing a plantation site for planting an energy crop. Plantation sites according to the disclosure may include a primary crop planted in a first row and in a second row, the first row being separated by an intermediate row. The primary crop may be planted using uniform spacing or non-uniform spacing. The intermediate row is divided into a center portion and two side portions (a first side portion and a second side portion). Methods according to embodiments of the disclosure include the steps of lifting a soil and plantation debris mixture from the intermediate area, redepositing a soil component of the soil and plantation debris mixture, and redepositing a plantation debris component of the soil and plantation debris mixture. In some embodiments, the soil component may be redeposited primarily into the center portion of the intermediate space. The plantation debris component may be redeposited into at least one of the two side portions.

Further aspects of the disclosure are directed towards methods for interplanting an energy crop with the primary crop. In some embodiments, the primary crop is a tree crop and the energy crop is a regenerating crop harvested for the production of heat, electric power, other combustible power, and/or for conversion to transportation fuels and other useful energy products. Such methods may be performed after the plantation site has been prepared according to the preparation methods described.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows.

DETAILED DESCRIPTION

The present disclosure describes methods for interplanting energy crops with a primary crop on a plantation site. Certain specific details are set forth in the following description and FIGS. 1-6 to provide a thorough understanding of various embodiments of the disclosure. Well-known structures, systems, and methods often associated with such systems have not been shown or described in detail to avoid unnecessarily obscuring the description of various embodiments of the disclosure. In addition, those of ordinary skill in the relevant art will understand that additional embodiments of the disclosure may be practiced without several of the details described below.

In this disclosure, the term "plantation site" is used to refer to an established forest, farm, or estate where a crop is grown. The term "primary crop" is used to refer to any type of tree crop known to a person of ordinary skill in the art. The term "energy crop" is used to refer to a regenerating crop harvested for the production of heat, electric power, other combustible power, and/or for conversion to transportation fuels and other useful energy products (e.g., ethanol). The term "plantation debris" is used to refer to any debris commonly encountered in forest operations including but not limited to stumps, sticks, twigs, and root balls.

Figure 1:
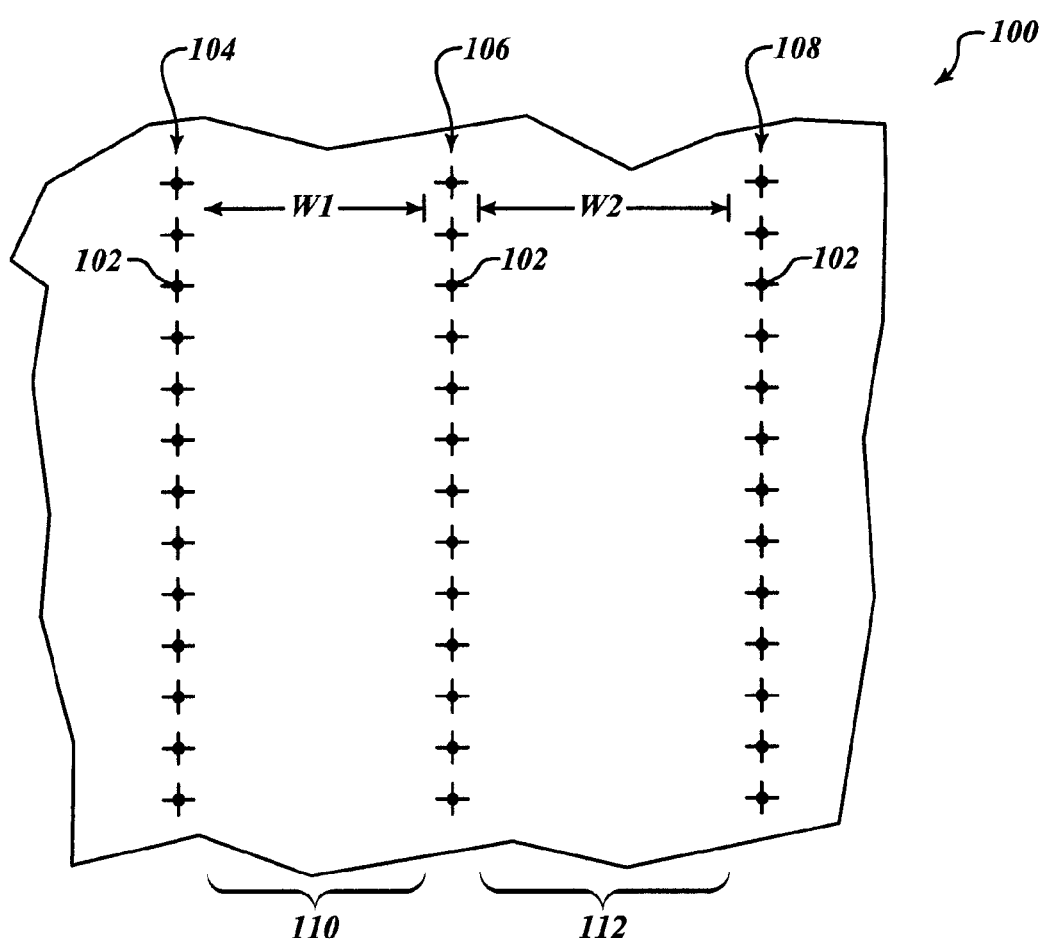
FIG. 1 is a plan view of a plot of land after plantation of a primary crop according to embodiments of the disclosure.

FIGS. 1-6 show plan views of a plot of land 100 on a plantation site over various time periods as it is treated and managed using methods according to embodiments of the disclosure. Referring to FIG. 1, a primary crop 102 may be planted in a first row 104, in a second row 106, and in a third row 108 on the plot 100. It should be appreciated that the number of crop units (e.g., trees) of the primary crop 102 planted and the number of rows seen in FIGS. 1-6 are merely for illustrative purposes. In that regard, the number of crop units in a row and the number of rows in a plot can be configured in a repeating pattern over any sized area, such as one or more acres of land.

In the illustrated example in FIG. 1 and in other examples throughout the disclosure, the primary crop 102 is shown as a tree crop. Tree crops according to the disclosure may include trees in any growth state, including, but not limited to, trees, tree seedlings, rooted cuttings, and tree seeds. As a non-limiting example, the tree crop may include a single species of trees (e.g., a single species of softwood or a single species of hardwood) or multiple species for forest diversity.

Examples of suitable softwood trees include, but are not limited to, the following: pine trees, such as loblolly pine, jack pine, Caribbean pine, lodgepole pine, shortleaf pine, slash pine, Honduran pine, Masson's pine, Sumatran pine, western white pine, egg-cone pine, longleaf pine, patula pine, maritime pine, ponderosa pine, Monterey pine, red pine, eastern white pine, Scots pine, araucaria tress; fir trees, such as Douglas fir; and hemlock trees, including any hybrids of any of the foregoing. Suitable softwood species for a plot of land used with the methods described herein are dependent upon desired wood products, as well as environmental and geographic factors.

Examples of suitable hardwood trees include, but are not limited to, the following: eucalyptus trees, such as Dunn's white gum, Tasmanian bluegum, rose gum, Sydney bluegum, Timor white gum, and the *E. urograndis* hybrid; populus trees, such as eastern cottonwood, bigtooth aspen, quaking aspen, and black cottonwood; and other hardwood trees, such as red alder, Sweetgum, tulip tree, Oregon ash, green ash, and willow, including any hybrids of any of the foregoing. Suitable hardwood species for a plot of land used with methods described herein are dependent upon desired wood products, as well as environmental and geographic factors.

Referring back to FIG. 1, the first row 104 and the second row 106 are shown separated by a first intermediate area 110 having a first width W1. The second row 106 and the third row 108 are shown separated by a second intermediate area 112 having a second width W2. Although FIG. 1 shows the first width W1 and the second width W2 to be approximately equal in size, if a non-uniform row spacing is selected, the first width W1 and the second width W2 may be substantially different.

The spacing between the rows (and accordingly the width of the respective intermediate areas) may be selected based on multiple factors. For example, the spacing may be selected to provide for large machinery and equipment to access the primary crop 102. The spacing may also be determined to provide space for activities for managing tree growth such as fertilization, vegetation and pest control, thinning, pruning, and harvesting. The size of the trees in the primary crop 102 at various stages of maturity may also be factored into the spacing selection. In some embodiments, the row spacing may be selected to optimize the combined revenues of the primary crop 102 and an energy crop interplanted with the primary crop 102. Other considerations for the determination of row spacing include, for example, sunlight restrictions, hydrology, wildlife, biodiversity, and environmental impact on the land.

In some embodiments, the width of the first intermediate space 110 (e.g., the first width W1) may be between about 15 and about 25 feet. In an exemplary embodiment, the first width W1 may be at least about 18 feet and the width of the second intermediate space 112 (e.g., the second width W2) may be at least about 15 feet. In other embodiments, the first width W1 may be at least about 20 feet and the second width W2 may be at least about 18 feet. Additionally, in some embodiments the second width W2 may be greater than the first width W1. In situations where uniform row spacing is selected, the first width W1 and the second width W2 may be substantially equal. It should be appreciated that row spacing reasonably above or below these ranges is within the scope of this disclosure.

Figure 2:
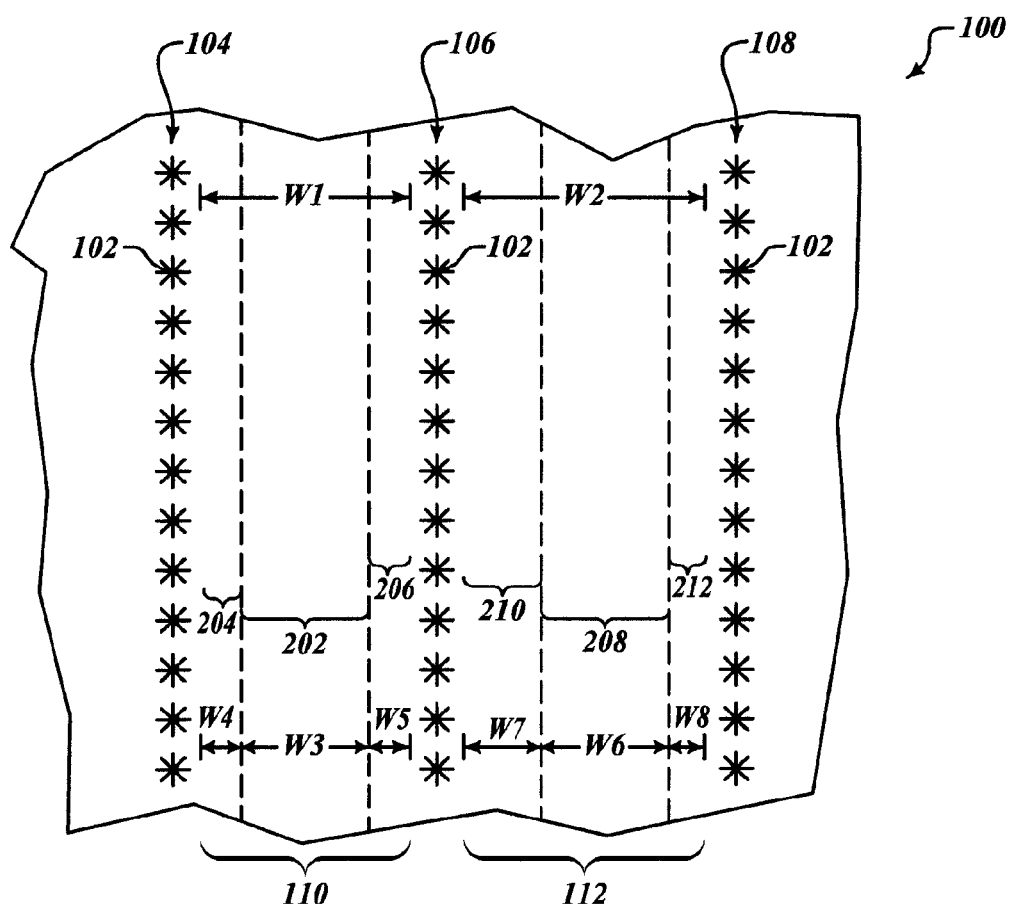
FIG. 2 is a plan view of the plot of land from FIG. 1 after the primary crop has been allowed to grow for a period of time.

Referring to FIG. 2, a plan view of the plot of land 100 on a plantation site is shown after the primary crop 102 has been allowed to grow for a period of time. In some embodiments, the intermediate area 110 may be established at the same time that the primary crop 102 is planted. For example, the rows for the primary crop 102 may be prepared, the intermediate area may be prepared, and then the both the primary crop 102 and the energy crop 602 may be planted. In some embodiments, the primary crop may be permitted to grow for about 2 to about 3 years. In other embodiments, this time may be determined based on other factors such as the tree species and surrounding environment. The primary crop 102 and the energy crop 602 may also be planted at the same time to provide maximum exposure to light for the energy crop 602 before the primary crop crop 102 gets large enough to shade the energy crop 602. In some embodiments the energy crop 602 may be planted after the primary crop 102 has been thinned and some of the trees removed to allow for more light. Generally, this may occur around age 10 to about 15. After the primary crop 102 has reached the desired maturity, the plot 100 may now be prepared for interplanting of an energy crop.

For purposes of illustrating methods according to the disclosure, FIG. 2 shows the first intermediate area 110 divided into three portions: a first center portion 202 having a third width W3, a first side portion 204 having a fourth width W4, and a second side portion 206 having a fifth width W5. Likewise, the second intermediate area 112 is shown divided into three portions: a second center portion 208 having a sixth width W6, a third side portion 210 having a seventh width W7, and a fourth side portion 212 having an eighth width W8. In some embodiments, the three portions in which the intermediate areas are divided may have substantially the same width. In other embodiments, the center portion may be substantially larger than the side portions. In a non-limiting example, W1 may be approximately 20 feet, W3 may be approximately 10 feet, W4 may be approximately 5 feet, and W5 may be approximately 5 feet. In another non-limiting example, W1 may be approximately 30 feet, W3 may be approximately 20 feet, W4 may be approximately 5 feet, and W5 may be approximately 5 feet. Additionally W1, W2, W3, W4, and W5 may have any intermediate values between the above-stated ranges. Further, the side portions may be different sizes.

According to embodiments of the disclosure, preparation of the plantation site includes performing a series of steps aimed at making the first intermediate area 110 and the second intermediate area 112 more suitable for planting energy crops. To simplify explanation, the following portion of the disclosure will describe such methods with reference to the first intermediate area 110; however, it should be understood that substantially the same steps may be performed on the second intermediate area 112. A person of ordinary skill in the art will also appreciate that the first intermediate area 110 and the second intermediate area 112 may be prepared according to embodiments of the disclosure at the same time or at different times.

Figure 3:
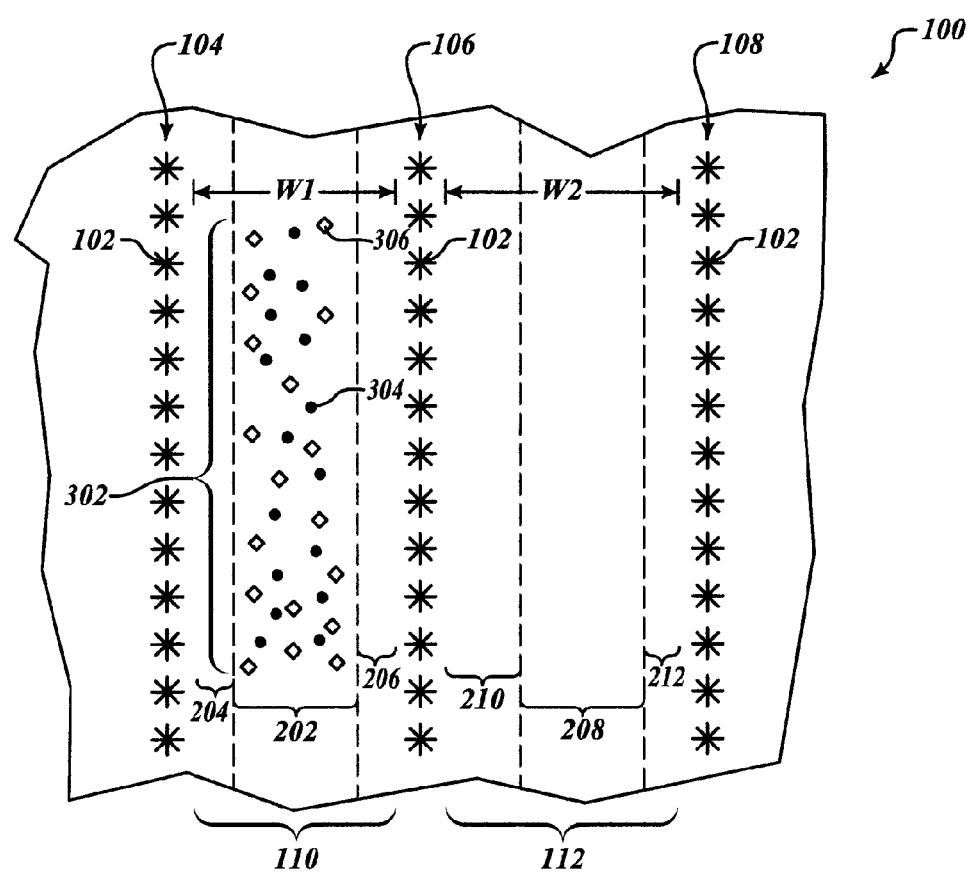
FIG. 3 is a plan view of the plot of land from FIG. 2 showing a soil and plantation debris mixture.

Referring to FIGS. 3-6, preparation methods according to embodiments of the disclosure are illustrated. FIG. 3 shows the plot 100 covered in a soil and plantation debris mixture 302. The soil and plantation debris mixture 302 will naturally be present on the plot 100 as a result of the plantation, growth, and/or harvest of the primary crop $102_1n$ some embodiments, the soil and plantation debris mixture 302 may be left over from the previous plantation harvest. The soil and plantation debris mixture 302 may consist of a soil component 304 and a plantation debris component 306 in any proportion. The soil component 304 is primarily soil (e.g., the superficial unconsolidated and usually weathered part of the mantle of the planer). The plantation debris component 306 is primarily plantation debris (e.g., any debris commonly encountered in forest operations including but not limited to stumps, sticks, twigs, and root balls). A person of ordinary skill in the art will appreciate that in many situations, the soil component 302 is not 100% soil and the plantation debris component is not 100% plantation debris. Further, in some embodiments, the soil component 304 may include a small portion of plantation debris and the plantation debris component 306 may include a small portion of soil.

Referring back to FIG. 3, methods according to embodiments of the disclosure may include two primary steps: lifting and redeposition. The lifting step may include lifting the soil and plantation debris mixture 302 from the plot 100. In some embodiments, lifting the soil and plantation debris mixture 302 may be performed by moving equipment in the first intermediate area 110 in a direction that is substantially parallel with the primary crop 102. Depending on the type of equipment used, the lifting step may be relatively brief or may consume a more substantial period of time. The scope of the present disclosure should not be limited in any manner that would require lifting of a minimum or maximum height or distance.

Figure 4:
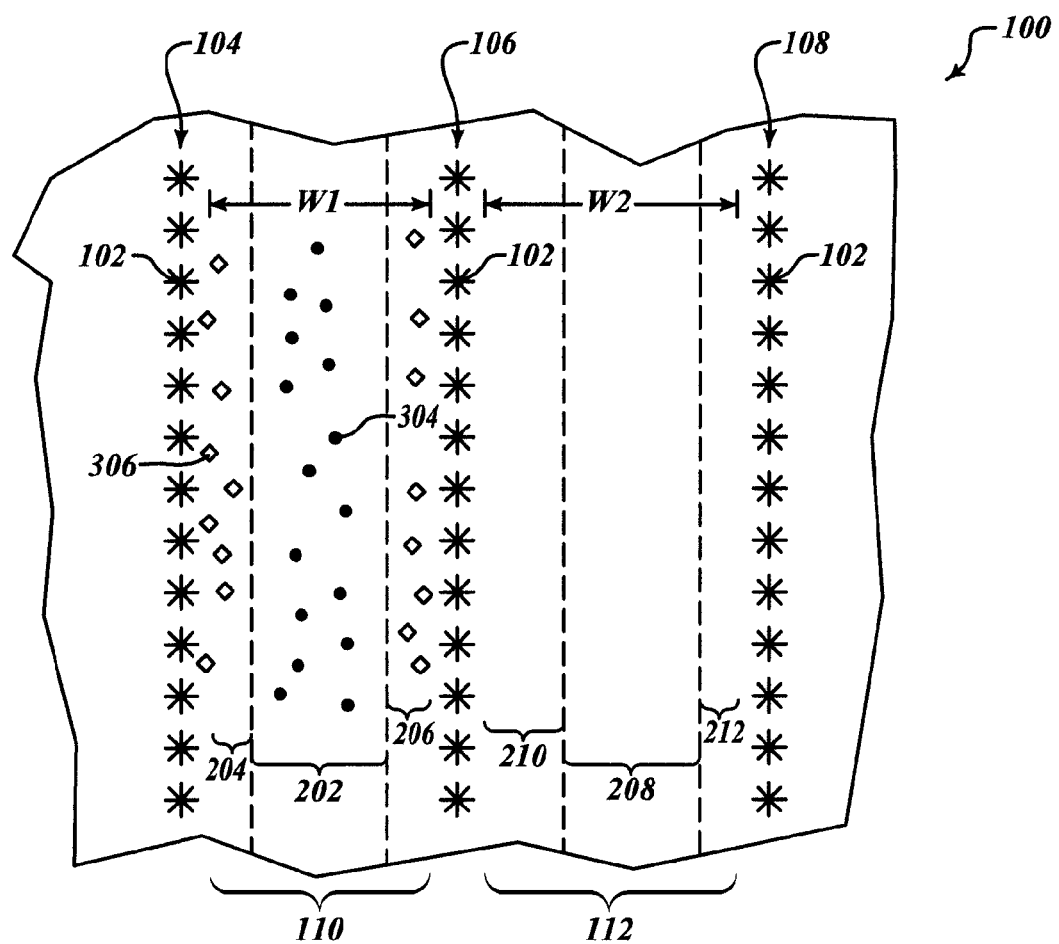
FIG. 4 is a plan view of the plot of land from FIG. 3 showing an exemplary distribution of a soil component and a plantation debris component according to embodiments of the disclosure.

After lifting, the soil and plantation debris mixture 302 may be redeposited onto the plot of land 100. Conventional redeposition techniques generally aim to push soil towards the primary crop 102 in order to encourage growth of the primary crop 102. In embodiments according to the disclosure, the soil and plantation debris mixture 302 is redeposited primarily into the first intermediate area 110, but distribution within the first intermediate area 110 considers enabling growth of an interplanted energy crop as well as the growth of the primary crop 102. For example, the soil component 304 may be directed away from the primary crop 102 during redeposition in order to prepare the first intermediate area 110 for planting of the energy crop. As shown in FIG. 4, the soil component 302 may be redeposited primarily into the first center portion 202. In some embodiments (e.g., as shown in FIG. 4), the plantation debris component 306 may be redeposited primarily into the first side portion 204 and/or the second side portion 206.

Figure 5:
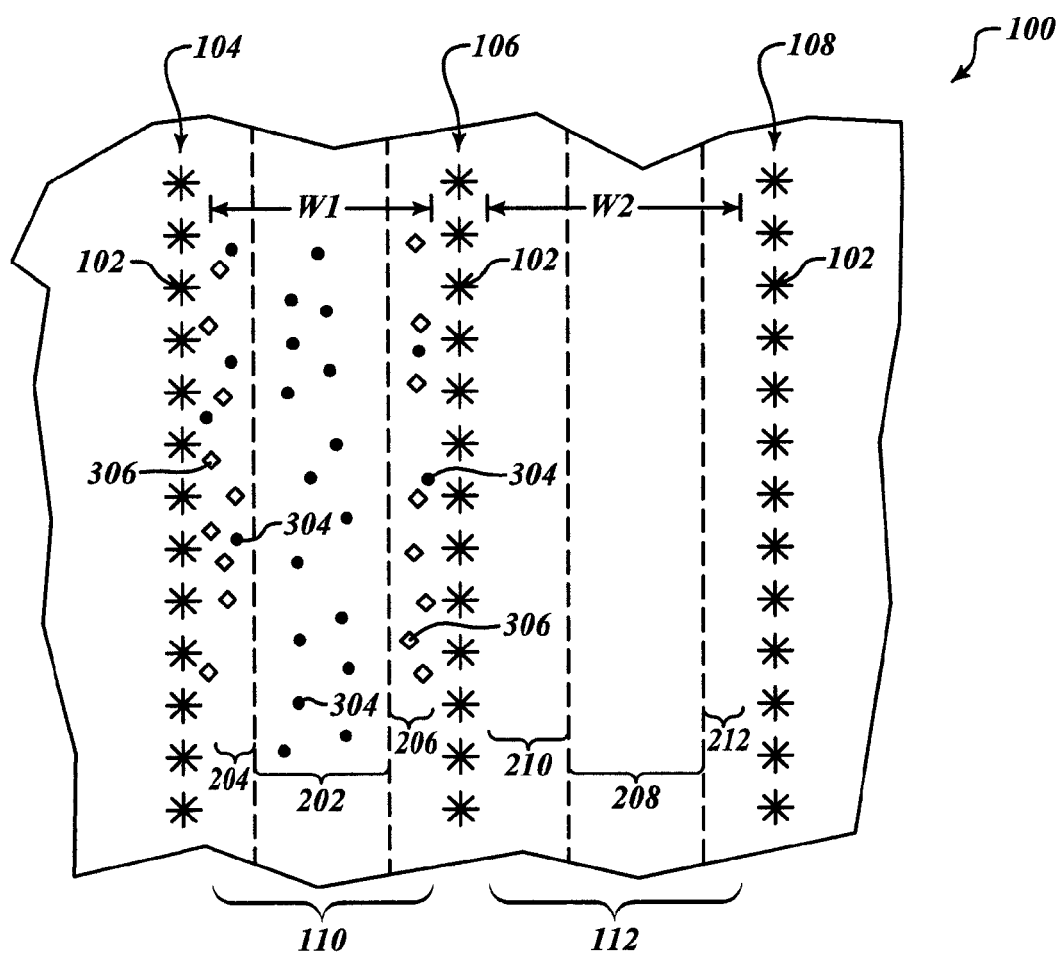
FIG. 5 is a plan view of the plot of land from FIG. 3 showing an exemplary distribution of a soil component and a plantation debris component according to embodiments of the disclosure.

In some embodiments, the exact distribution and manner in which the soil and plantation debris mixture 302 may be redeposited within the first intermediate area 110 may vary. In FIG. 5, for example, the majority of the soil component 304 is shown deposited in the first center portion 202; however, there is a small amount of soil component 304 present in the first side portion 204 and in the second side portion 206. In addition, substantially more of the plantation debris component 306 may be present in the first side portion 204 compared with the second side portion 206. In some embodiments, all or substantially all of the plantation debris component 306 may be redeposited into the first side portion 204. In some embodiments, 100% of a portion of a component that is lifted may not necessarily be redeposited. In some embodiments, a portion of the soil and plantation debris component 302 lifted from the first intermediate area 110 may be redeposited onto the second intermediate area 112. A person or ordinary skill in the art will appreciate that many variations of distributions are within the scope of the disclosure, but that it would be exhaustive to explain each one in detail.

In some embodiments, various additional steps may be performed with the steps discussed above. For example, an intermediate filtering step may be performed before the soil component 304 and the plantation debris component 306 are redeposited. In a non-limiting example, filtering may include separating the soil and plantation debris mixture 302 into a soil component 304 and a plantation debris component 306. A screen, filter, or any other equipment known to a person of ordinary skill in the art that is suitable for separating materials may be used to accomplish filtering.

In some embodiments, a leveling step may be performed on the first intermediate area 110 after redeposition of the soil component 304 and the plantation debris component 306. Leveling may be effective to change the slope of the terrain of the plot of land 100 to make it more suitable (e.g., more flat) for planting and growing energy crops. This may be accomplished using grader blades, grading trucks, or any other equipment known to a person of ordinary skill in the art. The result is a relatively flat strip with exposed mineral soil and relatively few stumps, root balls, or other debris that may cause problems while planting a crop.

One non-limiting example of a conventional piece of equipment suitable for use with methods according to the disclosure is a machine commonly referred to as a V-shear implement. V-shear implements may be attached to a tractor and pushed across the first intermediate space 110 to perform the lifting, deposition, and filtering steps described above. In some embodiments, standard V-shear implements may be configured so that the device's blade is operated just below the surface of the soil on the plot 100. Accordingly, plantation debris may be redeposited to the side portions (e.g., the first side portion 204 and the second side portion 206) of the first intermediate area 110 as the V-shear moves. At the same time, minor humps and swales in the plot's terrain may be also smoothed. According to embodiments of the disclosure, conventional V-shear equipment may be operated in any manner suitable to minimize movement of the soil component 304 to the side portions (e.g., the first side portion 204 and the second side portion 206) of the first intermediate area 110.

In addition to conventional equipment, methods according to embodiments of the disclosure may also be performed with other non-conventional but suitable equipment. Non-limiting examples of such equipment include soil treating systems, shear assemblies, and other devices described in U.S. patent application Ser. No. 13/309,214, filed on the same day as the present patent application, and titled "Soil Treating System and Shearing Assembly." A person of ordinary skill in the art will also appreciate that other types of equipment not explicitly mentioned in this disclosure may be used to perform the steps of methods described herein.

In some embodiments, a single piece of equipment may be used to perform one step in methods according to the disclosure. For example, the same piece of equipment may be used for lifting, redepositing, and filtering. In other embodiments, the same piece of equipment may be used for lifting, redepositing, filtering, and leveling. In other embodiments, different pieces of equipment may be used to perform any combination of different steps.

Figure 6:
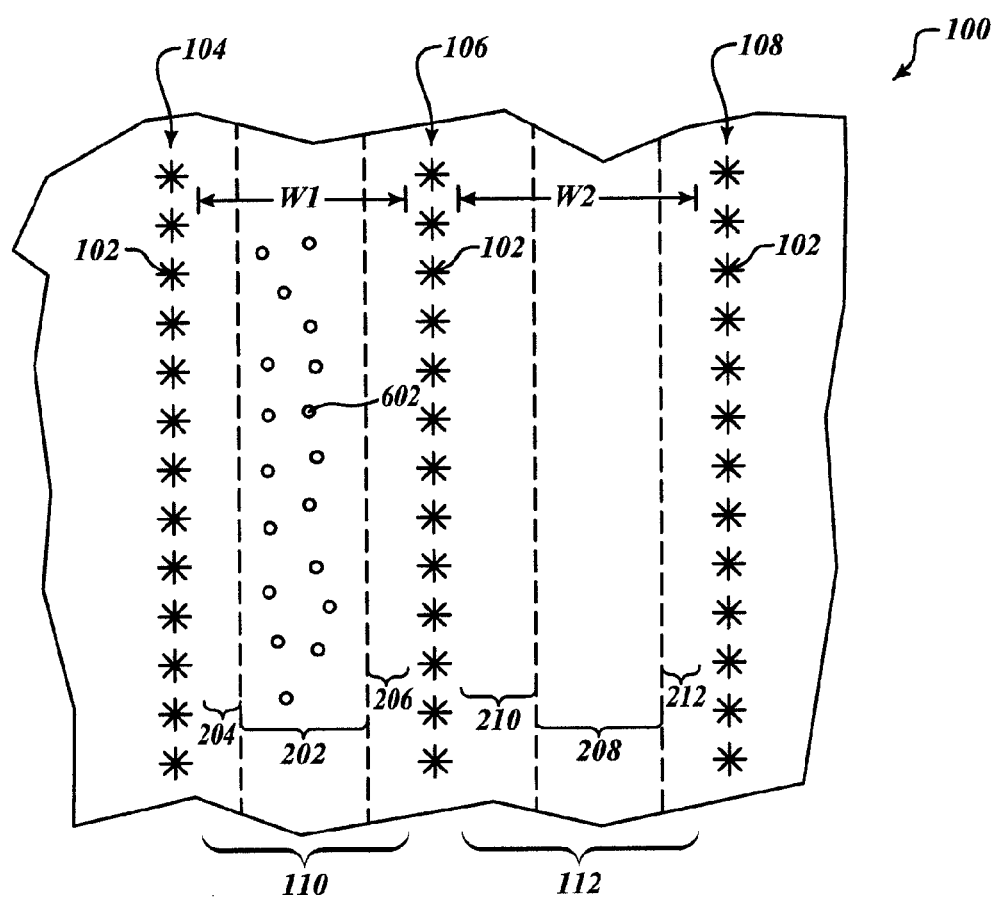
FIG. 6 is a plan view of the plot of land from FIG. 3 after the planting of an energy crop.

After preparation of the plot 100 according to methods described above, energy crops may be interplanted with the primary crop. FIG. 6 shows energy crops 602 planted in the first intermediate area 110. For clarity, the distribution of the soil component(s) 304 and plantation debris component(s) 306 is not shown in FIG. 6. Suitable energy crops 602 are regenerating lignocellulosic energy crops, including perennial plant species such as switch grass (including *panicum virgatum* and other varieties of the genus *panicum*), *miscanthus* (including *miscanthus giganteus* and other varieties of the genus *miscanthus*), giant reed (*arundo donax*), energy cane (*saccharum* spp.), and napier grass (*pennisetum purpureum*). These energy crops are grown for the specific purpose of producing energy from all or part of the resulting plant. As non-limiting examples, switch grass and *miscanthus* are energy crops that regenerate naturally following a full periodic harvest, for example, an annual harvest.

Methods according to the embodiments of the disclosure align the cost of planting a long-term primary crop with the economic returns of harvesting a combination of the primary crop and the energy crop. In embodiments where the primary crop is a tree crop, the primary crop may be harvested to make wood products such as lumber, wood chips, pulp for cellulosic products, etc. The energy crops may be harvested as appropriate for the production of heat, electric power, other combustible power, and/or for conversion to transportation fuels and other useful energy products. Accordingly, methods according to the disclosure include periodically harvesting the energy crop as well as harvesting the primary crop. In some embodiments, systems and methods according to the disclosure are expected to reduce the amount of tillage necessary for such harvesting.

Words in the above disclosure using the singular or plural number may also include the plural or singular number, respectively. For example, use of the term "soil component" could also apply to and "soil components." Likewise, use the term "crop" could also apply to and "crops."

While the plot of land 100 in the illustrated embodiments of FIGS. 1-6 is shown to be planted with at least two crops: a primary crop 102 and an energy crop 602, it should be appreciated that planting the plot of land 100 with more than two crops is also within the scope of the present disclosure. Further, specific types of crops not explicitly disclosed that would be obvious to a person of ordinary skill in the art are envisioned to be within the scope of the disclosure.

From the foregoing, it will be appreciated that the specific embodiments of the disclosure have been described herein for purposes of illustration, but that various modifications may be made without deviating from the disclosure. For example, dimensions of the intermediate portions and side portions specified in this disclosure may be modified given tolerances acceptable to a person of ordinary skill in the art. Additionally, methods according to the disclosure may be used with equipment not explicitly described provided that such equipment is suitable for use. Aspects of the disclosure described in the context of particular embodiments may be combined or eliminated in other embodiments. For example, aspects relating to embodiments where the primary crop is planted using uniform spacing may be combined or eliminated with aspects relating to embodiments where the primary crop is planted using non-uniform spacing. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

We claim:

1. A method for interplanting a primary crop and an energy crop on a plantation site, the method comprising the steps of:
   planting the primary crop in a first row and in a second row, the first row and the second row being separated by an intermediate area, the intermediate area being divided into a center portion, a first side portion, and a second side portion;
   preparing the plantation site for planting the energy crop by:
   (a) lifting a soil and plantation debris mixture from the intermediate area, the soil and plantation debris mixture comprising a soil component and a plantation debris component;
   (b) redepositing the soil component onto the intermediate area primarily into the center portion; and
   (c) redepositing the plantation debris component onto the intermediate area primarily into the first side portion and/or the second side portion; and
   planting the energy crop in the intermediate area.

2. The method of claim 1, further comprising the step of allowing the primary crop to grow for a period of time before preparing the plantation site for planting the energy crop.

3. The method of claim 1, further comprising the step of leveling the intermediate area after step (c).

4. The method of claim 1, further comprising the step of filtering the soil and plantation debris mixture to separate the soil component from the plantation component before step (b).

5. The method of claim 1 wherein the intermediate area is about 18 to about 20 feet wide.

6. The method of claim 1 wherein the center portion of the intermediate area is about 9 to about 10 feet wide.

7. The method of claim 1 wherein the energy crop is switch grass.

8. The method of claim 1 wherein the primary crop is a tree crop.

9. A method for interplanting a primary crop and an energy crop on a plantation site, the method comprising the steps of:
   planting the primary crop in a first row, a second row, and a third row;
       wherein the first row and the second row are separated by a first intermediate area, the first intermediate area being divided into a first center portion, a first side portion, and a second side portion; and
       wherein the second row and the third row are separated by a second intermediate area, the second intermediate area being divided into a second center portion, a third side portion, and a fourth side portion;
   preparing the first intermediate area for planting the energy crop by:
       lifting a first soil and plantation debris mixture from the first intermediate area, the first soil and plantation debris mixture comprising a first soil component and a first plantation debris component;

redepositing the first soil component into the first intermediate area primarily in the first center portion; and redepositing the first plantation debris component into the first intermediate are primarily in the first side portion and/or the second side portion; and planting the energy crop in the first intermediate area.

10. The method of claim 9, further comprising the step of allowing the primary crop to grow for a period of time before preparing the plantation site for planting the energy crop.

11. The method of claim 9, further comprising the steps of:

preparing the second intermediate area for planting the energy crop by:

lifting a second soil and plantation debris mixture from the second intermediate area, the second soil and plantation debris mixture comprising a second soil component and a second plantation debris component;

redepositing the second soil component into the second intermediate area primarily in the second center portion; and redepositing the second plantation debris component into the second intermediate area primarily in the third side portion and/or the fourth side portion; and planting the energy crop in the second intermediate area.

12. The method of claim 9 wherein the first intermediate area has a first width and the second intermediate area has a second with, the first width being greater than the second width.

13. The method of claim 12, further comprising the steps of:

leveling the first intermediate area after the step of redepositing the first plantation debris component; and leveling the second intermediate area after the step of redepositing the second plantation debris component.

14. A method for preparing a plantation site for planting an energy crop, the plantation site having a primary crop planted in a first row and in a second row, the first row and the second row being separated by an intermediate area, the method comprising the steps of:

(a) lifting a soil and plantation debris mixture from the intermediate area, the soil and plantation debris mixture comprising a soil component and a plantation debris component;

(b) redepositing the soil component into the intermediate area primarily in the center portion;

(c) redepositing the plantation debris component into the intermediate area primarily in the first side portion and/or the second side portion; and (d) leveling the intermediate area.

15. The method of claim 14 wherein the intermediate area is at least about 18 feet wide.

16. The method of claim 14 wherein the primary crop is a tree crop.

17. The method of claim 14 wherein the step of lifting the soil and plantation debris mixture from the intermediate area is performed by a shear assembly attached to a prime mover or tractor.

18. A method for preparing a plantation site for planting an energy crop, the plantation site having a primary crop planted in a first row and in a second row, the first row and the second row being separated by an intermediate area, the method comprising the steps of:

(a) lifting a soil and plantation debris mixture from the intermediate area, the soil and plantation debris mixture comprising a soil component and a plantation debris component, and filtering the soil and plantation debris mixture to separate the soil component from the plantation component;

(b) redepositing the soil component into the intermediate area primarily in the center portion; and (c) redepositing the plantation debris component into the intermediate area primarily in the first side portion and/or the second side portion.

19. A method for preparing a plantation site for planting an energy crop, the plantation site having a primary crop planted in a first row and in a second row, the first row and the second row being separated by an intermediate area, the method comprising the steps of:

(a) lifting a soil and plantation debris mixture from the intermediate area, the soil and plantation debris mixture comprising a soil component and a plantation debris component by moving a shear assembly having a substantially V-shaped serrated cutting blade across the intermediate area;

(b) redepositing the soil component into the intermediate area primarily in the center portion; and (c) redepositing the plantation debris component into the intermediate area primarily in the first side portion and/or the second side portion.

* * * * *